United States Patent [19]

Feild

[11] Patent Number: 4,901,978
[45] Date of Patent: Feb. 20, 1990

[54] FLOW CONTROL VALVE

[75] Inventor: Eugene P. Feild, Webb City, Mo.

[73] Assignee: Laminar Fluid Controls, Inc., Webb City, Mo.

[21] Appl. No.: 209,284

[22] Filed: Jun. 20, 1988

[51] Int. Cl.⁴ .................... F16K 31/12; F16K 39/00
[52] U.S. Cl. .................... 251/282; 251/120; 137/509; 137/524
[58] Field of Search ............... 251/205, 118, 120, 282; 137/524, 510, 509

[56] References Cited

U.S. PATENT DOCUMENTS

| | | | |
|---|---|---|---|
| 477,192 | 6/1892 | Bastian | 251/330 X |
| 1,196,142 | 8/1916 | Schroeder | 137/224 |
| 1,330,458 | 2/1920 | Young | 417/311 |
| 1,603,514 | 10/1926 | Carter | 137/494 |
| 1,972,748 | 9/1934 | Smith et al. | 251/333 |
| 2,321,679 | 6/1943 | Houston | 137/524 |
| 2,372,631 | 3/1945 | Stevenson et al. | 137/494 |
| 2,839,078 | 6/1958 | Lornitzo | 137/508 |
| 2,932,316 | 4/1960 | Stanton | 137/508 |
| 2,938,540 | 5/1960 | Schatzman et al. | 137/508 |
| 2,963,040 | 12/1960 | Zimmer | 137/505.11 |
| 2,966,170 | 12/1960 | Raulins | 251/205 X |
| 3,010,695 | 11/1961 | Banks | 251/205 X |
| 3,052,259 | 9/1962 | Van Der Velden | 137/510 |
| 3,086,749 | 4/1963 | Frye | 251/205 |
| 3,317,252 | 5/1967 | Gassman | 303/54 |
| 3,360,952 | 1/1968 | Lewis | 62/196.2 |
| 3,439,701 | 4/1969 | Stella | 137/359 |
| 3,544,061 | 12/1970 | Moy | 251/205 X |
| 3,545,485 | 12/1970 | Clark | 137/508 |
| 3,554,222 | 1/1971 | Kihara et al. | 251/205 X |
| 3,856,043 | 12/1974 | Feild et.al. | 137/508 |
| 3,918,495 | 11/1975 | Abrahams | 137/625.48 |
| 3,975,116 | 8/1976 | Feild et al. | 417/311 |
| 4,140,436 | 2/1979 | Schumacher | 137/508 X |
| 4,175,585 | 11/1979 | Boehme | 137/509 |
| 4,278,234 | 7/1981 | Baumann | 251/205 X |
| 4,283,041 | 8/1981 | Kujawski | 251/205 |
| 4,768,558 | 9/1988 | Weber | 251/205 X |
| 4,771,192 | 6/1892 | Bastian | 251/330 X |

OTHER PUBLICATIONS

Linflo Brochure (date unknown).
Farris Safety Valves (date unknown).
U.S. ParaPlate Corporation brochure (date unknown).
U.S. ParaPlate Corporation Back Pressure Regulators brochure (date unknown).
U.S. ParaPlate Corporation Drawing Nos. RV633-3000, 13004, 13009 (date unknown).

Primary Examiner—John Rivell
Attorney, Agent, or Firm—Marger & Johnson, Inc.

[57] ABSTRACT

A pair of opposed valve members defines a radial flow path therebetween which extends from the outer radial peripheries of each valve member to an axial bore formed in one of the valve members. The other valve member is mounted on a stem having an upper end which is urged upwardly by a spring disposed around the stem. A substantially cylindrical element is threadably engaged in the upper end of a valve body in which the valve members are received and the stem is urged thereagainst. In another embodiment, the stem is fixedly connected to the cylindrical element. Rotational movement of the cylindrical element axially moves the stem thereby controlling flow through the valve.

37 Claims, 3 Drawing Sheets

FLOW CONTROL VALVE

BACKGROUND OF THE INVENTION

1. Field of the Invention

The instant invention relates to a flow control valve and more particularly to such a valve which is suitbale for controlling fluids at high pressures and flow rates.

2. Description of the Related Art

A typical prior art flow control valve includes a stem having a cone mounted on the lower end thereof which is movable toward and away from an orifice for regulating flow therethrough. The cone and orifice are received in a housing cavity which is in fluid communication with an inlet. The orifice is in fluid communication with an outlet. In operation, fluid enters the inlet and leaves the outlet at a reduced pressure and/or flow rate depending upon the relative positions of the cone (which is set by turning the stem) and the orifice.

Such prior art valves suffer from several disadvantages. Under extremely high flows and pressures, large axial forces are exerted on the stem making the same very difficult, if not impossible, to adjust when fluid is flowing through the valve. In addition, the turbulent nature of the flow between the cone and the orifice causes both wear on the valve parts and extremely loud noise. Such prior art valves are relatively imprecise in that the same orifice opening may not be obtained when the stem is rotated to different angular positions and thereafter returned to a previous angle position. In other words, a desired valve setting may not necessarily be repeatably obtained.

SUMMARY OF THE INVENTION

The instant invention comprises an upright housing having a vertical bore formed therein. A first valve member is mounted on the lower end of the housing and has an upwardly directed working face in fluid communication with the vertical bore and an outlet orifice which extends into the first valve member from the working face. A shaft is mounted on the housing for movement in the bore along the axis thereof. Mounted on the lower end of the shaft is a second valve member having a working face formed thereon which is directed toward the working face on the other valve member. Inlet means formed on one side of the housing permits fluid flow into the vertical bore adjacent the outer peripheries of the working faces and means are provided for substantially balancing the upward and downward forces applied to the shaft when the valve is in operative condition.

It is an object of the instant invention to provide an improved flow control valve which overcomes the above-enumerated disadvantages of the prior art.

Another object of the instant invention is to provide such a valve which can accurately and precisely control flow and pressure over a wide range and at extremely high flows and pressures.

It is still another object of the invention to provide such a valve assembly which is resistant to wear and which produces relatively little noise at high flows and pressures.

It is still another object of the invention to provide such a valve which may be relatively easily adjusted when the valve is subject to high flows and pressures.

DETAILED DESCRIPTION OF THE PREFERRED EMBODIMENTS

Figure 1:
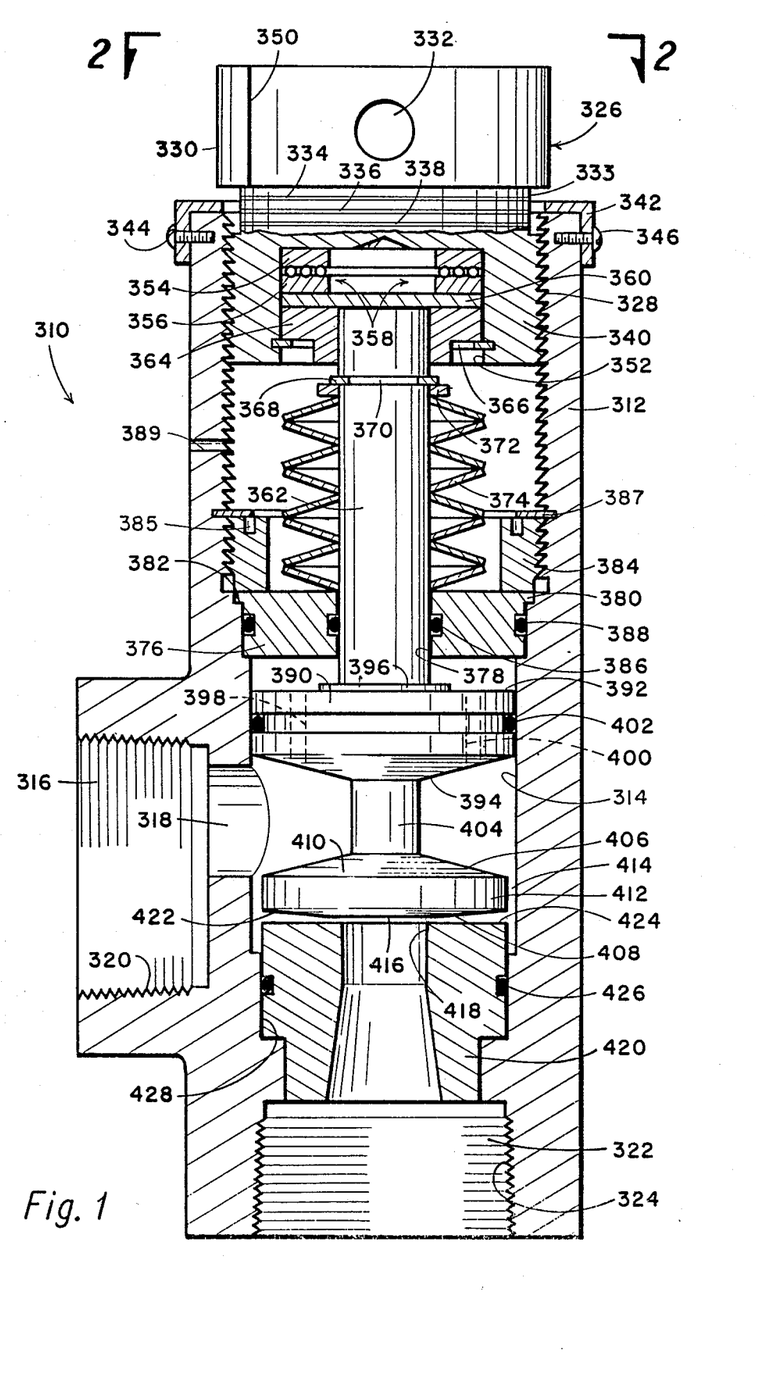
FIG. 1 is a cross-sectional view of a first valve constructed in accordance with the instant invention.

Indicated generally at 310 in FIG. 1 is a flow control valve constructed in accordance with the instant invention. Valve 310 includes a tubular housing 312 having a bore 314 formed therein. Housing 312 includes inlet means or inlet 316, such communicating with the interior of bore 314 via bore 318. Inlet 316 includes a set of radially inner threads 320 for interconnecting the same to a pipe (not shown) for providing fluid from the pipe into bore 314.

Housing 312 further includes an outlet bore 322 which also includes a radially inner set of threads 324 for connecting outlet bore 322 to another pipe (also not shown) for transmitting fluid from the interior of bore 314 away from the valve.

Generally speaking, valve 310 is used as a flow control valve in a pipeline having flow into inlet 316, through bore 314 and out bore 322. As will later become apparent herein, valve 310 may be adjusted to variably restrict the flow of fluid in the pipeline.

An adjustment nut 326 is threadably engaged with housing 312 at the upper end of bore 314 via a buttress threaded connection 328. The adjustment nut is also referred to herein as a shaft moving means and as a cylindrical element. Nut 326 includes a substantially cylindrical upper portion 330 having a bore 332 which extends laterally therethrough. A second bore (viewable in FIG. 19) extends through upper portion 330 substantially normal to bore 332. A bar or rod (not shown) may be inserted into or through bore 332 (or the other bore) in order to facilitate turning nut 326.

Nut 326 further includes an intermediate cylindrical portion 333 having a set of three parallel lines 334, 336, 338 scribed about the circumference thereof thereby defining circles coaxial with cylindrical portion 333.

A lower cylindrical portion 340 includes a set of radially outer threads which interconnect with threads on the radially inner surface of the upper portion of bore 314 to form threaded connection 328.

Figure 2:
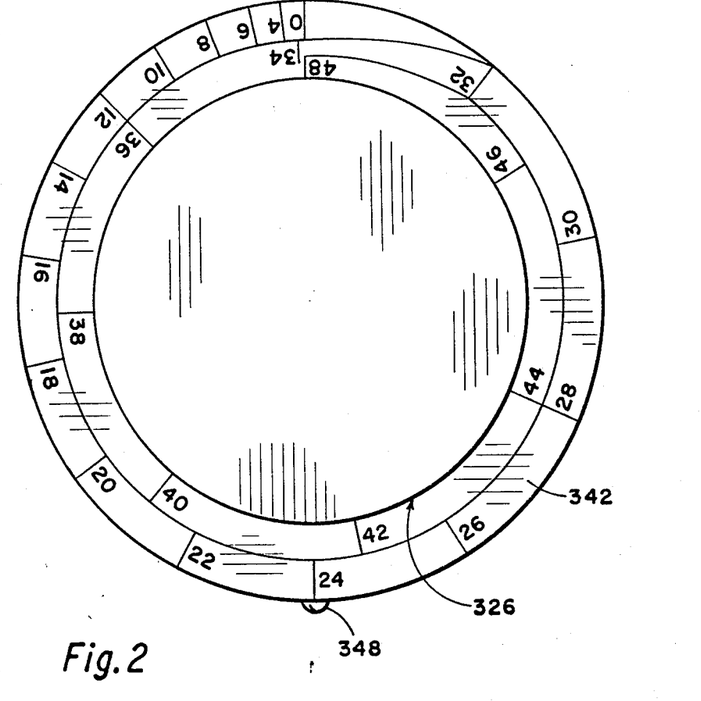
FIG. 2 is a view taken along line 2—2 in FIG. 1.
Figure 3:
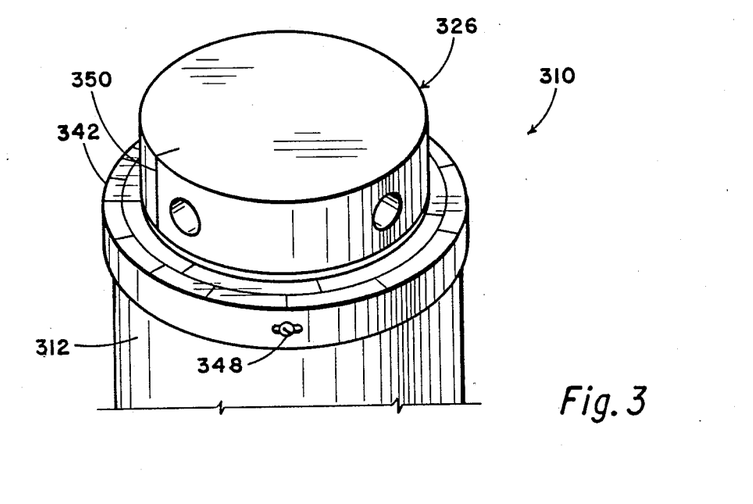
FIG. 3 is a perspective view of the upper portion of the valve shown in FIG. 1.

An annular scale ring 342 is mounted on the upper surface of housing 312 via screws 344, 346 (in FIG. 1) and screw 348 (in FIGS. 2 and 3). Slots as shown in ring 342 permit adjustment of the radial position of the scale ring. As can best be viewed in FIG. 2, ring 342 includes numerals and lines printed thereon which, as will later be more fully described, provide an indication of the adjustment of valve 310.

Upper cylindrical portion 330 of adjustment nut 326 includes a line 350 scribed thereon which is used in conjunction with reading scale 342.

Lower cylindrical portion 340 includes a downward-facing axial bore 352. A pair of opposed annular bearing raceways 354, 356 are received in the upper portion of bore 352 and thrust bearing, indicated generally at 358, is received therebetween. Raceways 354, 356 and bearings 358 are referred to herein collectively as bearing means. A substantially planar disk 360 is interposed between the lower surface of raceway 356 and the upper surface of a substantially cylindrical shaft 362.

An annular shaft guide 364 is received over the upper end of shaft 362. A retaining ring 366 is positioned against a lower surface of shaft guide 364 thereby maintaining the shaft guide, disk 360, raceways 354, 356 and bearing 358 in position as shown. Retaining ring 366 is received in an annular groove formed on the radially inner surface of bore 352.

A retaining ring 368 is received in a groove 370 formed on the radially outer surface of shaft 362. Abutted against the underneath side of ring 368 is a washer 372. Biasing means or spring 374 is compressed between washer 372 and a disk 376. In the instant embodiment of the invention a plurality of commercially available spring washers comprise spring 374; however, a commercially available coil spring would work equally well.

Disk 376 includes a central bore 378 through which shaft 362 is received. A circular lip 380 includes a downward facing annular surface which rests on an upward facing annular shoulder 382 formed in bore 314. A threaded collar 384 is engaged with the buttress threads found on the radially inner surface of bore 314 as shown. The collar is abutted against disk 376 for maintaining the same in place. Bores, like bore 385 are provided to enable a wrench (not shown) to engage collar 384 for threadably engaging and disengaging the collar with bore 318. A retaining ring 387 is received in a groove formed on the radially inner surface of bore 314 immediately above collar 384 thereby securing the same in position. O-rings 386, 388 seal between the radially outer surface of disk 376 and the radially inner surface of bore 314 and between the radially inner surface of central bore 378 and the radially outer surface of shaft 362, respectively. Disk 376 and o-rings 386, 388 are referred to herein collectively as sealing means.

A bore 389 is provided as a vent in housing 312 in the event of leakage through o-rings 386, 388.

A guide means or piston 390 is formed integrally with shaft 362 and includes a substantially flat upper surface 392 and a tapered lower surface 394. An annular raised portion 396 is formed integrally with shaft 362 and piston 390. When shaft 362 moves upwardly, portion 396 abuts against the lowermost surface of disk 376 thereby maintaining fluid communication between surfaces 394, 392 via bores 398, 400. An o-ring 402 is engaged between the radially outer surface of piston 390 and the radially inner surface of bore 314. O-ring 402 serves as a guide for maintaining piston 390 and its associated structure substantially coaxial with housing 312. The radially outer surface of piston 390 which is closely adjacent the radially inner surface of bore 314 is referred to herein as a cylindrical portion of piston 390. A shaft 404, such being coaxial with shaft 362, connects the lower portion of piston 390 with the upper portion of a valve member 406. Shaft 404 is formed integrally with piston 390 and valve member 406. Valve member 406 includes a first lower side, such having a circular working face 408 formed thereon, and a second upper side 410 which includes a tapered portion as shown. A cylindrical portion 412 of valve member 406 defines an annular space 414 between the radially outer surface of cylindrical portion 412 and the radially inner surface of bore 314.

Working face 408 includes a substantially flat circular portion 416 centered thereon. As can be seen, the diameter of circular portion 416 is slightly greater than that of an outlet orifice 418 which is formed in a valve member 420 (which is referred to herein as a first valve member) beneath circular portion 416. A tapered portion 422 is defined between circular portion 416 and the radially outer edge of valve member 406. Valve member 420 includes an upwardly directed substantially flat working face 424. Working face 424 and circular portion 416 are substantially parallel to one another. In the instant embodiment of the invention, the angle formed between tapered portion 422 and working face 424 is approximately four (4) degrees, thirty-four (34) minutes.

It should be appreciated that the instant invention works equally well if tapered portion 422 is formed on valve member 420 and the lower end of valve member 406 is substantially flat thus providing a tapered opening between the valve members about the circumference thereof when the same are abutted against one another.

When shaft 362 is urged downwardly, in a manner which will be hereinafter described, valve member 406 abuts against valve member 420 and working faces 408, 424 define therebetween a transversely substantially wedge-shaped space.

Outlet bore 322 and outlet orifice 418 are referred to herein collectively as outlet means. An o-ring 426 seals between the radially outer surface of valve member 420, which is pressed into a counterbore 428 in housing 312 as shown, to seal between the radially inner surface of the counterbore and the radially outer surface of the annular valve member.

In operation, inlet 316 is connected to a pipe (not shown) which provides a flow of fluid into bore 314 via bore 318. Another pipe (also not shown) is connected to outlet bore 322 to provide a fluid flow path from bore 314.

After fluid enters bore 314 via bore 318, it flows upwardly via bores 398, 400 to the space between upper surface 392 of piston 390 and the lower surface of disk 376. Fluid also flows to the space between working faces 408, 424 via annular space 414. Even at high pressures and flow rates, annular space 414 substantially evenly distributes the fluid around the outer peripheries of working faces 408, 424 thereby preventing lateral loading of valve member 406 and the structure associated therewith.

Fluid flows between the working faces from the radially outer peripheries thereof toward orifice 418, into the orifice and into outlet bore 322.

The degree to which valve 310 restricts the flow of fluid passing therethrough can be changed by adjusting nut 326. If it is desired to decrease restriction of fluid flow, nut 326 is unscrewed from threaded connection 328 thereby enabling upward movement of shaft 362. Since spring 374 biases the shaft upwardly, as nut 326 moves upwardly the spring moves the shaft also upwardly while maintaining contact between the upper surface of shaft 362 and disk 360. As the shaft raises, the space between working faces 408, 424 increases thereby increasing flow through the valve.

Alternatively, nut 326 may be screwed downwardly in threaded connection 328 by turning nut 326 in the opposite direction. Such urges the working faces toward one another thereby decreasing fluid flow through the valve. Raceway 354 turns with nut 326 while raceway 356 remains stationary. It can thus be seen that shaft 362 does not rotate as it is raised and lowered responsive to turning nut 326.

When valve member 406 is operating so that faces 408, 424 are relatively close to one another, the degree of taper between the working faces is critical. If the taper, for substantially flat faces as in the instant embodiment of the invention, is less than about two (2) degrees, twenty (20) minutes, the pressure between working faces 408, 424 may drop to the point where the pressure above piston 406 causes the piston to slam shut, i.e., piston 406 abuts against working face 424 thus preventing flow through orifice 418.

Pressure on the radially inner peripheries of working faces 408, 424 may approach atmospheric pressure, i.e., the pressure in orifice 418, while the pressure on the radially outer peripheries of working faces 408, 424 is at the pressure of the fluid provided to inlet 316. This fluid pressure may be as high as 5,000 p.s.i. and higher, thus producing a substantial pressure drop between the radially outer and inner peripheries of working faces 408, 424.

In the case of, e.g., substantially parallel working faces, this pressure drop tends to be evenly distributed between orifice 418 and the radially outer peripheries of working faces 408, 424 as face 408 approaches face 424. When such occurs, the pressure beneath valve member 406 is substantially lower than that above it, thus causing the pressure on top of the piston to slam the same shut as described above.

In order to maintain the pressure drop which occurs between the radially outer peripheries of working faces 408, 424 and the radially inner peripheries thereof closely adjacent the radially inner peripheries (i.e., adjacent orifice 418), the working faces must be further apart at the radially outer peripheries thereof than at the radially inner peripheries. In the case of substantially flat working faces as in the instant embodiment of the invention, it has been discovered that sufficient spacing between the faces occurs when the working faces assume an angle of at least approximately two (2) degrees, twenty (20) minutes to one another.

When the pressure drop occurs adjacent orifice 418 rather than at the outer peripheries of the working faces, the lowered pressure appears beneath a smaller area of valve member 406, i.e., that adjacent orifice 418, thereby creating less downward force than if the pressure drop was evenly distributed between the radially outer peripheries of the working faces and the radially inner peripheries thereof. It is to be appreciated that the degree of angle, at least in the lower ranges of taper in accordance with the invention, e.g., between approximately two (2) degrees, twenty (20) minutes and approximately twenty-five (25) degrees, affects the distribution of the pressure drop beneath the piston. Thus, changing the taper angle changes the downward force on valve member 406 for a given relative position of working faces 408, 424.

The sizes of valve member 406 and its associated structure are selected so as to substantially balance the fluid pressure forces acting on piston 390, valve member 406 and the shafts associated with each. For example, when the valve is in operative condition, i.e., filled with fluid flowing therethrough, fluid pressure acts upwardly on that portion of working face 408 which is over working face 424. Likewise, fluid pressure acts downwardly on tapered surface 410. Fluid pressure acts upwardly on tapered lowered surface 394 and, through bores 398, 400, acts downwardly on upper surface 392. Each of the foregoing surfaces as well as the sizes of shaft 404, 362 and orifice 418 are selected so that the upward and downward forces acting on valve member 406 are substantially equal when fluid is in the valve.

Spring 374 is non-linear and creates a smaller upward force on shaft 362 and the structure associated therewith when the spring is extended than when the spring is compressed. Thus, when working faces 408, 424 approach one another, and the pressure begins to drop beneath valve member 406 as described above, the upward force in spring 372 is greater since the spring is more compressed. The valve therefore tends to operate in a substantially balanced condition.

A person having ordinary skill in the art can select appropriate piston and shaft sizes and spring tension to balance the upward and downward faces acting on valve member 406 and its associated structure thereby providing a valve which is easily adjustable even at very high pressures and flow rates. If the valve is to be used in a system which includes high downstream pressure, the same will act on circular portion 416. This can be taken into account in selecting piston and shaft sizes and tension on spring 374 to substantially balance the upward and downward forces acting on valve member 406 thereby allowing easy valve adjustment even in the presence of high downstream pressure.

Spring 374 prevents hysteresis which might be introduced by slack in threaded connection 328 by maintaining upward pressure on shaft 362 and nut 326 at all times.

Scale ring 342 is calibrated so that line 350 indicates an equivalent orifice diameter on the scale ring. The equivalent orifice diameter is calculated by determining the minimum cross sectional flow area through valve 310 and then converting the same to a diameter of a round orifice which has the same cross sectional area.

The minimum cross sectional area through which flow occurs in valve 310 is defined by the radially outer surface of a cylinder having a diameter equal to orifice 418 and a height equal to the distance between central portion 416 and working face 424. The radially outer surface area of such a cylinder is the minimum cross sectional flow area through which fluid in the valve flows. Relatively small rotational movement of nut 326 significantly changes the cross-sectional flow area thereby enabling a wide range of flow control with relatively small movements of shaft 362.

The numbers appearing on scale ring 342 are diameters of circular areas, in sixty-fourths of an inch, which are equal to the above-described minimum cross sectional flow area in valve 310 when line 350 is aligned with a selected number on scale 342. When line 334 only is visible above scale 342 in the view of FIG. 1, line 350 is used to read off the radially outermost scale on ring 342, i.e., the scale from 0-34. When lines 334, 336 are both visible, the scale is read by aligning line 350 with a number on the scale from 34-48 and when all of lines 334, 336, 338 are visible, the valve is wide open.

Figure 4:
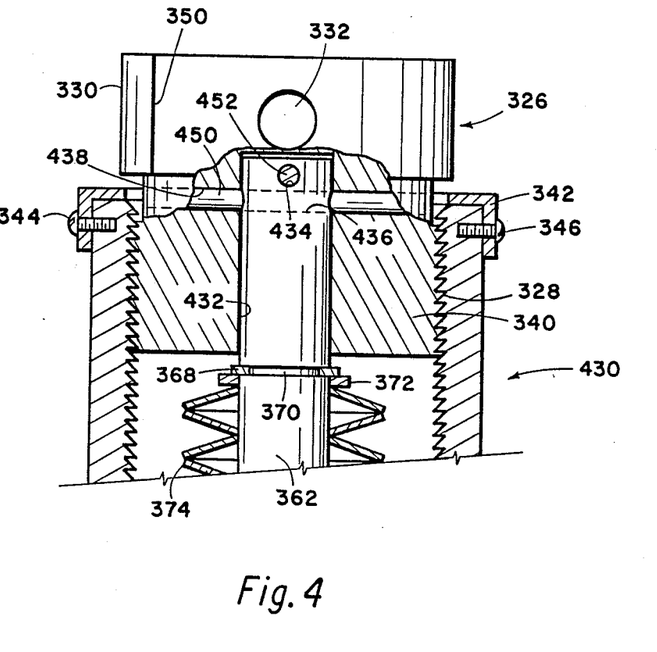
FIG. 4 is a partial cross-sectional view of a second valve constructed in accordance with the instant invention.

Turning now to FIG. 4, indicated generally at 430 is a second valve constructed in accordance with the instant invention. The structure which has been previously identified in FIG. 1-3 retains the same numeral in FIG. 4. Shaft 362 is received in an axial bore 432 formed in lower cylindrical portion 340. A pair of bores, 434, 436 are formed transversely to one another through the upper end of shaft 362 as shown. A pair of corresponding bores, one of which is bore 438, are formed transversely through cylindrical portion 340 so that when shaft 362 is received within bore 432, bore 436 is coaxially aligned with bore 438 and bore 434 is likewise coaxially aligned with an associated bore (not visible) formed through cylindrical portion 340.

A pin 450 is received through bores 436, 438 and a pin 452 is received through bore 434 and the corresponding bore (not visible) formed through cylindrical portion 340.

The pin and bore arrangement as described thus prevents rotational as well as axial movement of shaft 362 relative to cylindrical portion 340.

The operation of the embodiment of the invention shown in FIG. 4 is essentially the same as that for FIGS. 1-3. However, in the embodiment of FIG. 4, shaft 362 is prevented from downward movement in the event of a decrease in pressure beneath valve member 406 thus maintaining valve member 106 in the position selected by rotation of cylindrical portion 340.

It is to be appreciated that additions and modifications may be made to the instant embodiment of the invention without departing from the spirit thereof which is defined in the following claims.

What is claimed is:

1. A flow control valve comprising:
   a housing;
   a first valve member mounted on said housing and having a working face formed thereon;
   a bore formed in said housing, said bore being in communication with said first valve member working face;
   a second valve member received in said bore and having a first side directed toward said first valve member and a second side opposite thereto, said first side having a working face formed thereon;
   a shaft substantially coaxially received in said bore, said shaft being connected to said second side of said second valve member;
   inlet means formed in said housing for permitting a flow of fluid to fluid to a location adjacent the outer peripheries of said working faces;
   one of said valve members having an orifice extending thereinto from its working face, said faces being engageable with each other near the orifice to prevent fluid flow through the orifice;
   outlet means coupled with said housing for permitting a flow of fluid out of said orifice;
   means for substantially balancing the upward and downward pressures applied to said shaft when said valve is in operative condition; and
   means for sealing between the radially outer surface of said shaft and the radially inner surface of said bore, said sealing means comprising a substantially planar disk coaxial with said bore and having a central bore therethrough for receiving said shaft.

2. The valve of claim 1 wherein said second valve member and said inlet means are arranged and constructed to permit fluid flowing into said inlet means to also flow into said bore adjacent said second side of said second valve member.

3. The valve of claim 2 wherein said second valve member further includes a cylindrical portion substantially coaxial with said bore, said cylindrical portion forming a radially outermost portion of said second valve member.

4. The valve of claim 3 wherein said inlet means further comprises a substantially annular space defined between said second valve member cylindrical portion and the radially inner surface of said bore.

5. The valve of claim 1 wherein said flow control valve further includes means for biasing said shaft away from said first valve member.

6. The valve of claim 5 wherein said biasing means comprise a spring disposed between said disk and said shaft.

7. The valve of claim 1 wherein said flow control valve further includes means for moving said shaft along its axis.

8. The valve of claim 7 wherein said moving means comprises a substantially cylindrical element threadably engaged in said bore adjacent the end of said shaft opposite said second valve member.

9. The valve of claim 8 wherein said flow control valve further comprises bearing means disposed between said moving means and said shaft.

10. The valve of claim 1 wherein said orifice is formed in said first valve member substantially coaxial therewith.

11. The valve of claim 10 wherein said shaft diameter is substantially equal to said orifice diameter.

12. A flow control valve comprising:
    a housing;
    a first valve member mounted on said housing and having a working face formed thereon;
    a bore formed in said housing, said bore being in communication with said first valve member working face;
    a second valve member received in said bore and having a first side directed toward said first valve member and a second side opposite thereto, said first side having a working face formed thereon;
    a shaft substantially coaxially received in said bore, said shaft being connected to said second side of said second valve member;
    inlet means formed in said housing for permitting a flow of fluid to a location adjacent the outer peripheries of said working faces;
    one of said valve members having an orifice extending thereinto from its working face, said faces being engageable with each other near the orifice to prevent fluid flow through the orifice;
    outlet means coupled with said housing for permitting a flow of fluid out of said orifice;
    means for substantially balancing the upward and downward pressure applied to said shaft said valve is in operative condition; and
    guide means disposed between said shaft and said bore.

13. The valve of claim 12 wherein said guide means includes a substantially cylindrical portion which is coaxially mounted on said shaft, said cylindrical portion having a radially outer surface which abuts against the radially inner surface of said bore.

14. The valve of claim 13 wherein said guide means includes means for communicating fluid pressure on one side thereto to the other side.

15. A flow control valve comprising:
    an upright housing;
    a vertical bore formed therein;
    a first valve member mounted on the lower end of said housing, said first valve member having an upwardly directed working face in fluid communication with said vertical bore and an outlet orifice which extends into said first valve member from its working face;
    a shaft mounted on said housing for movement in said bore along the axis thereof;

a second valve member mounted on the lower end of said shaft, said second valve member having a working face thereon which is directed toward said first valve member working face, said faces being engageable with one another near said outlet orifice to prevent fluid flow through the orifice;

inlet means formed on one side of said housing for permitting a flow of fluid into said vertical bore adjacent the outer peripheries of said working faces; and means for substantially balancing the upward and downward faces applied to said shaft when said valve in operative condition, said balancing means comprising a nonlinear spring.

16. The apparatus of claim 16 wherein said balancing means maintains at least some upward force applied to said shaft under all conditions.

17. The apparatus of claim 15 wherein said spring exerts a greater upward force when said faces are engaged with one another than when said faces are spaced apart.

18. A flow control valve comprising:
a housing;
a first valve member mounted on said housing and having a working face formed thereon;
a bore formed in said housing, said bore being in communication with said first valve member working face;
a second valve member received in said bore and having a first side directed toward said first valve member and second side opposite thereto, said first side having a working face formed thereon;
a shaft substantially coaxially received in said bore, said shaft being connected to said second side of said second valve member;
inlet means formed in said housing for permitting a flow of fluid to a location adjacent the outer peripheries of said working faces;
one of said valve members having an orifice extending thereinto from its working face, said faces being engageable with each other near the orifice to prevent fluid flow through the orifice;
outlet means coupled with said housing for permitting a flow of fluid out of said orifice; and
means for substantially balancing the upward and downward pressure applied to said shaft when said valve is in operative condition, including means for biasing said second valve member away from said first valve member.

19. The valve of claim 18 wherein one of said valve faces includes a taper thereon which forms an angle of between about two degrees, twenty minutes and about twenty-five degrees with the other valve face.

20. The valve of claim 19 wherein said second valve member and said inlet means are arranged and constructed to permit fluid flowing into said inlet means to also flow into said bore adjacent said second side of said second valve member.

21. The valve of claim 20 wherein said second valve member further includes a cylindrical portion substantially coaxial with said bore, said cylindrical portion forming a radially outermost portion of said second valve member.

22. The valve of claim 21 wherein said inlet means further comprises a substantially annular space defined between said second valve member cylindrical portion and the radially inner surface of said bore.

23. The valve of claim 19 wherein said flow control valve further comprises means for sealing between the radially outer surface of said shaft and the radially inner surface of said bore.

24. The valve of claim 19 wherein said flow control valve further includes means for moving said shaft along its axis.

25. The valve of claim 24 wherein said moving means comprises a substantially cylindrical element threadably engaged in said bore adjacent the end of said shaft opposite said second valve member.

26. The valve of claim 25 wherein said flow control valve further comprises bearing means disposed between said moving means and said shaft.

27. The valve of claim 10 wherein said orifice is formed in said first valve member substantially coaxial therewith.

28. The valve of claim 27 wherein said shaft diameter is substantially equal to said orifice diameter.

29. A flow control valve comprising:
a housing;
a first valve member mounted on said housing and having a working face formed thereon;
a bore formed in said housing, said bore being in communication with said first valve member working face;
a second valve member received in said bore and having a first side directed toward said first valve member and a second side opposite thereto, said first side having a working face formed thereon;
a shaft substantially coaxially received in said bore, said shaft being connected to said second side of said second valve member;
inlet means formed in said housing for permitting a flow of fluid to a location adjacent the outer peripheries of said working faces;
one of said valve members having an orifice extending thereinto from its working face, said faces being engageable with each other near the orifice to prevent fluid flow through the orifice;
outlet means coupled with said housing for permitting a flow of fluid out of said orifice; and
means for substantially balancing the upward and downward pressures applied to said shaft when said valve is in operative condition; and
means for moving said shaft along its axis, including a substantially cylindrical element threadably engage in said bore adjacent the end of said shaft opposite said second valve member, said shaft being fixedly attached to said cylindrical element.

30. The valve of claim 29 wherein one of said valve faces includes a taper thereon which forms an angle of between about two degrees, twenty minutes and about twenty-five degrees with the other valve face.

31. The valve of claim 30 wherein said second valve member and said inlet means are arranged and constructed to permit fluid flowing into said inlet means to also flow into said bore adjacent said second side of said second valve member.

32. The valve of claim 31 wherein said second valve member further includes a cylindrical portion substantially coaxial with said bore, said cylindrical portion forming a radially outermost portion of said second valve member.

33. The valve of claim 32 wherein said inlet means further comprises a substantially annular space defined between said second valve member cylindrical portion and the radially inner surface of said bore.

34. The valve of claim 30 wherein said flow control valve further comprises means for sealing between the radially outer surface of said shaft and the radially inner surface of said bore.

35. The valve of claim 30 wherein said flow control valve further comprises bearing means disposed between said moving means and said shaft.

36. The valve of claim 30 wherein said orifice is formed in said first valve member substantially coaxial therewith.

37. The valve of claim 3 wherein said shaft diameter is substantially equal to said orifice diameter.

* * * * *

UNITED STATES PATENT AND TRADEMARK OFFICE
CERTIFICATE OF CORRECTION

PATENT NO. : 4,901,978

DATED : February 20, 1990

INVENTOR(S) : Eugene P. Feild

It is certified that error appears in the above-identified patent and that said Letters Patent is hereby corrected as shown below:

Cover Page,
    Inventor: Change "Webb City, Mo." to --Fort Wayne, IN--;

References Cited: Delete "4,771,192 6/1892 Bastian 251/330 X-- (last entry);

| | |
|---|---|
| Column 1, | line 8: Change "suitbale" to --suitable--; |
| Column 2, | line 52: Change "scale ,ring" to --scale ring-- |
| Column 8, | line 46: Change "pressure" to --pressures--; |
| | line 46: After "shaft" insert --when--; |
| Column 9, | line 15: Change second instance of "16" to --15--; |
| | line 31: After "and" insert --a--; |
| | line 46: Change "pressure" to --pressures--; |

UNITED STATES PATENT AND TRADEMARK OFFICE
CERTIFICATE OF CORRECTION

PATENT NO. : 4,901,978

DATED : February 20, 1990

INVENTOR(S) : Eugene P. Feild

It is certified that error appears in the above-identified patent and that said Letters Patent is hereby corrected as shown below:

Column 10, line 15: Change "10" to --19--;

Column 12, line 6: Change "3" to --36--.

Signed and Sealed this

Twenty-third Day of July, 1991

*Attest:*

HARRY F. MANBECK, JR.

*Attesting Officer*   *Commissioner of Patents and Trademarks*